United States Patent [19]
Wang

[11] Patent Number: 5,366,605
[45] Date of Patent: Nov. 22, 1994

[54] WATER DISINFECTING APPARATUS AND PROCESS

[75] Inventor: Baicheng Wang, Xianwei Jiashu Beiyuan, China

[73] Assignee: Xiangshun Song, Xiaojia, China

[21] Appl. No.: 41,711

[22] Filed: Apr. 1, 1993

Related U.S. Application Data

[63] Continuation-in-part of Ser. No. 19,224, Feb. 18, 1993, abandoned.

[51] Int. Cl.$^5$ .............................................. C02F 1/467
[52] U.S. Cl. ..................... 204/228; 204/229; 204/231; 204/258; 204/263; 204/266
[58] Field of Search ............... 204/231, 228, 263, 266, 204/258, 229

[56] References Cited

U.S. PATENT DOCUMENTS

| | | | |
|---|---|---|---|
| 4,334,968 | 6/1982 | Sweeney | 204/96 |
| 4,613,415 | 9/1986 | Wreath et al. | 204/98 |
| 4,790,946 | 8/1988 | Jansen | 210/748 |
| 5,037,519 | 8/1991 | Wiscombe | 204/237 |
| 5,094,734 | 3/1992 | Torrado | 204/234 |

FOREIGN PATENT DOCUMENTS

| | | |
|---|---|---|
| 2037361U | 5/1989 | China . |
| 2096559 | 2/1992 | China . |

Primary Examiner—John Niebling
Assistant Examiner—Arun S. Phasge

[57] ABSTRACT

The present invention relates to an apparatus and a process for disinfecting polluted water to supply water suitable for drinking, swimming water, or industrial use. The apparatus and process according to the invention disinfect water by using $ClO_2$ as a disinfectant. The $ClO_2$ is generated by an electrolytic generator comprising an anodic cell and a cathodic cell having an anode and a neutral electrode in the anodic cell and a cathode in the cathodic cell. A sensing element is arranged in the reactor to detect the $ClO_2$ content in the disinfected water. A monitor connected to the sensing element and a regulator for the electric power source adjusts the voltage and current supplied to the anode of the electrolytic generator in response to the signal from the sensing element so as to continuously provide a suitable amount of $ClO_2$ to effectively disinfect the polluted water. The apparatus and process of the present invention reduces electric power consumption. The amount of work necessary to determine the degree of disinfection of the treated water is also reduced.

4 Claims, 3 Drawing Sheets

WATER DISINFECTING APPARATUS AND PROCESS

CROSS REFERENCE TO RELATED APPLICATION

This is a continuation-in-part application of application Ser. No. 08/019,224 filed Feb. 18, 1993, now abandoned.

INTRODUCTION

The present invention generally relates to an apparatus and a process for disinfecting contaminated or polluted water. More particularly, this invention relates to an apparatus and a process for disinfecting contaminated or polluted water to supply disinfected water that is suitable for drinking, swimming, or industrial use.

BACKGROUND OF THE INVENTION

With the increase in population and industrialization, present day water, as supplied by rivers and from the underground, may be polluted by sewage and industrial waste, containing a multitude of germs or pathogens. Moreover, the water as supplied may also be odious and discolored due to the presence of these pollutants. Thus, to obtain water of a good quality, which is suitable for drinking, swimming or industrial use, has comes a problem. Various apparati and processes for disinfecting polluted water have been proposed.

Conventional apparati and processes for removing pollutants from water employ sodium hypochlorite and/or chlorine gas. According to these processes, sewage is disinfected and purified by using an aqueous solution of NaOCl and/or $Cl_2$ obtained by the electrolytic reduction of an aqueous NaCl solution. There are several drawbacks to these conventional apparati and processes. The apparati are generally complicated and difficult to use. Moreover, the bactericidal effect or the degree of disinfection is not satisfactory. The NaOCl and/or $Cl_2$ containing solutions are dangerous to work with because a cover layer of chlorine gas is often needed to keep the pH of the water in a desirable range to achieve a desired level of disinfection and purity.

Further, certain pollutants in water, such as phenol when treated with chlorine, produces compounds, such as chlorinated phenol, with odors that are extremely unpleasant and sickening. Moreover, if the water supply is polluted with organic substances, these substances may react with chlorine to produce organic hydrocarbons, which may be carcinogenic.

U.S. Pat. No. 4,790,949 discloses a process for the preparation of a disinfectant for water with improved disinfecting and bactericidal effects. The disinfectant is prepared by electrolyzing an aqueous NaCl and NaOCl solution to obtain an aqueous NaOCl solution enriched with chlorine at a constant pH value but without the presence of free chlorine gas.

Chinese Patent CN 2,037,361U discloses an apparatus for supplying disinfected drinking water continuously. The structure of the disclosed apparatus is simple. However, it suffers from the fact that NaOCl is used as the principal disinfectant with all of the ensuing disadvantages.

In order to overcome these drawbacks, an apparatus and method using $ClO_2$ gas as a disinfectant for treating polluted water had been disclosed. It was found that the oxidizing potential of $ClO_2$ is much higher than chlorine gas and can be used to effectively kill germs or pathogens and remove discoloration and odor from the water. At the same time, the danger of producing carcinogens such as organic hydrocarbons is avoided.

However, the prior disclosed $ClO_2$ generator has other disadvantages. The process is inefficient and a low rate of $ClO_2$ is generated. This results in the need for an excessive amount of work to determine the level of bacteria and the presence of pollutants because the results are needed to adjust the working condition of the apparatus to achieve a desired level of disinfection. For the above reasons, up to the present, it has been difficult to directly and continuously supply sufficient disinfected water suitable for daily and industrial use, for example with less than 3 colibacillus/L, at a sufficient rate.

The object of the present invention is to provide an apparatus for disinfecting continuously and effectively the polluted water by using $ClO_2$.

The another object of the present invention is to provide a satisfactory process of using $ClO_2$ to continuously and effectively disinfect polluted water.

SUMMARY OF THE INVENTION

The objects of the present invention are achieved by a water purifying and disinfecting apparatus comprising an electrolytic generator, a wye, a reactor, a monitor, a sensing element and an electric power source. The generator comprises an anodic cell containing an anode and a neutral electrode and a cathodic cell containing a cathode, the anodic and the cathodic cells being separated by a plurality of cation permeable membranes. The reactor for disinfection comprises a mixer connected to the electrolytic generator via the wye. The monitor is electrically connected between the electric power source and the sensing element mounted in the upper portion of the reactor and regulates the operations of the electrolytic generator.

Briefly, in the apparatus according to the present invention, $Na^+$ ions diffuses through the cation permeable membranes from the anodic cell to the cathodic cell where the $Na^+$ ions react with $OH^-$ to form NaOH. $ClO_2$ is generated in the anodic cell. The neutral electrode in the anode cell promotes the electrolytic process by enhancing the rate of diffusion of $Na^+$.

Sewage or industrial waste water is pumped into the left portion of a wye, and $ClO_2$ produced by electrolysis in the anodic cell enters the wye via a valve comprising a spring and a hemispherical seat located in the upper part of the central portion of the wye. The valve is activated by the negative pressure produced by flowing fluid through the wye. The sewage or industrial waste water is mixed with $ClO_2$ by the turbulent current generated in the reactor and is effectively disinfected and purified therein.

The process for disinfecting polluted water according to the present invention comprises the following steps:

A. providing a low voltage electrical power source to supply a voltage in the range of 1–15 V and a current in the range of 0–1000 A to the anode and cathode of the electrolytic generator wherein the voltage and current density of the anode of the electrolytic generator is adjusted by means of a monitor, connected to the electric power source, in response to an electrical signal generated by a sensing element mounted in the upper portion of a reactor and controlling thereby the rate of $ClO_2$ generated;

B. feeding into the anodic cell an NaCl aqueous solution at a concentration of 20–40% by weight; and feeding into the cathodic cell distilled water;

C. feeding polluted water into the left portion of a wye wherein the polluted water is mixed with $ClO_2$ gas from the electrolytic generator of which the quantity of $ClO_2$ drawn into the wye is controlled by adjusting a regulating valve positioned outside of and between the left and right portions of the wye;

D. feeding the mixture from the right portion of the wye into the reactor; and

E. finally drawing disinfected water out of the reactor.

BRIEF DESCRIPTION OF THE DRAWINGS

The apparatus and the process for disinfecting water according to the present invention is illustrated with reference to the accompanying drawings, in which.

DETAILED DESCRIPTION OF THE INVENTION

The present invention and its advantages will be better understood and appreciated with reference to the detailed description of embodiments of the present invention as follows.

Figure 1:
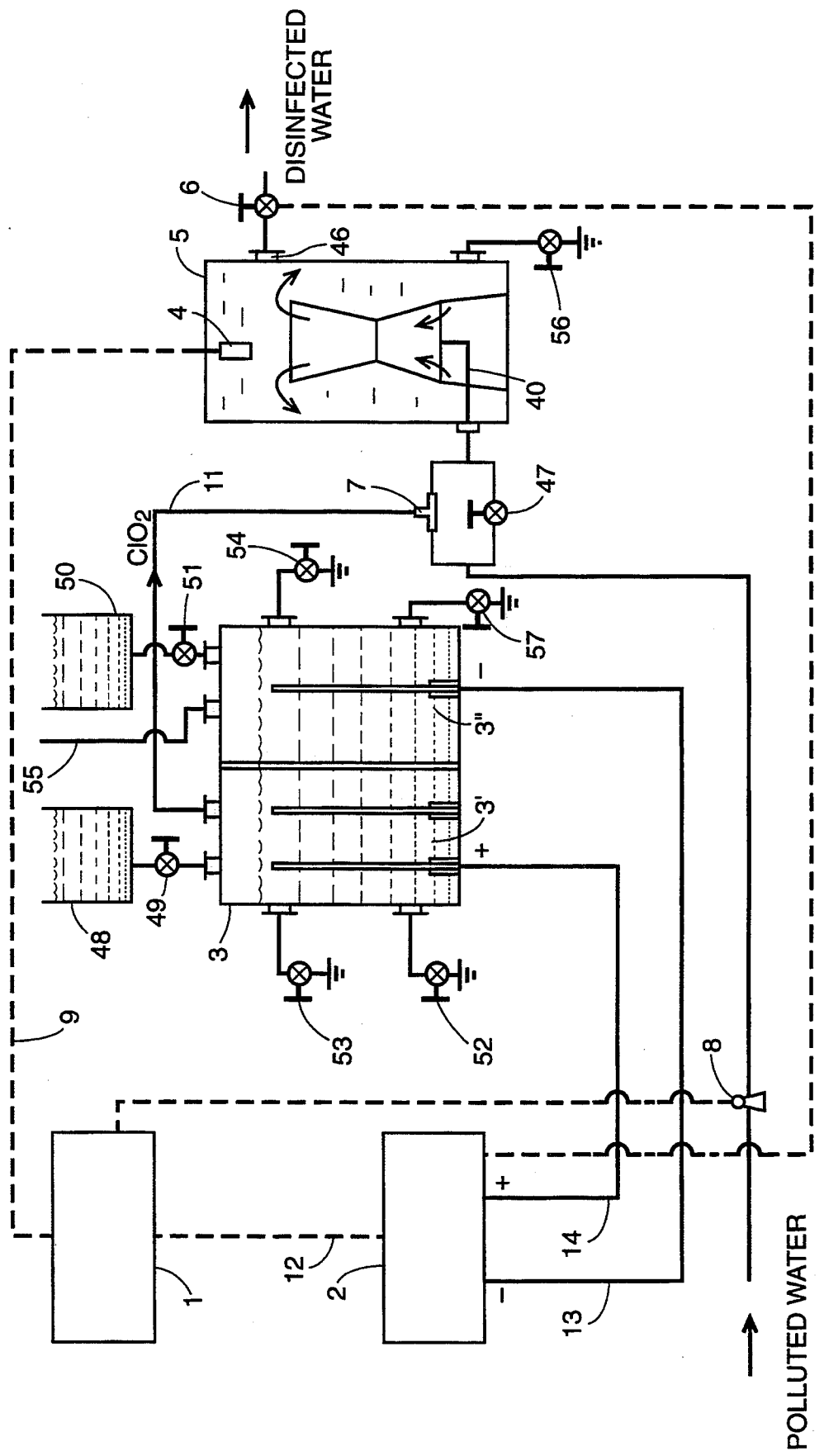
FIG. 1 is a schematic diagram of an embodiment of an apparatus for disinfecting water according to the present invention.

FIG. 1 is a schematic diagram of an embodiment showing an apparatus for disinfecting water according to the present invention. A low voltage electrical source (2) controlled by a silicon controlled regulator with a rectifier (e.g. 220 V, 50 Hz) continuously supplies an adjustable voltage of 1–15 V and a current of 0–1000 A to an electrolytic generator (3) with an anode (30) and a cathode (22). The positive terminal of the electrical source is connected to the anode (30) via an electric wire (14), and the negative terminal of the electrical source is connected to the cathode (22) via a second electric wire (13). The electrolytic generator (3) consists of a sealed corrosion resisting case, in which two cation permeable membranes (21) are mounted to separate the generator (3) into two cells, an anodic cell (3'), and a cathodic cell (3''). The anodic cell (3') is filled with an aqueous NaCl solution at a concentration of 20%–40% by weight via an inlet (43) from a storage tank (48), and is further provided with an anodic outlet (19) situated at the upper part of the anodic cell. The quantity of NaCl solution introduced is controlled by a valve (49) mounted between the inlet (43) and the storage tank (48). The anodic outlet (19) is connected to one end of a $ClO_2$ discharge pipe (11), the opposite end of the discharge pipe being connected to the upper part of the central portion of a wye (7). The cathodic cell (3'') is also provided with an outlet (44) and an inlet (58). The cathodic cell inlet (58) is connected to a distilled water storage tank (50) via a pipe. A valve (51) controls the desired quantity of distilled water flowing into the cathodic cell (3'').

Hydrogen, electrolytically generated in the cathodic cell (3''), is removed through the cathodic outlet (44) situated at the upper part of the cathodic cell. $Na^+$ in the anodic cell (3') diffuses into the cathodic cell (3'') through the cation permeable membranes (21) during electrolysis. The left portion of the horizontally mounted wye (7) is connected to a supply of polluted water via a pump (8), and the right portion of the wye is connected to a bent pipe (40) which is in turn connected to the lower portion of a mixer in the reactor (5) for disinfection. The left and right portions of the wye (7) are connected with a regulating valve (47) in parallel therewith to control the flow rate of sewage in the wye (7) and in turn control the amount of $ClO_2$ solution drawn into the reactor (5). An additional two outlets (25) and (60) with valves (52, 53) are mounted on one side of the anodic cell (3'), the upper anodic side outlet (60) is used the discharge overflow and the lower anodic side outlet (25) is used for removing water or residual solution to clean out the anodic cell. Two side outlets (23) and (59) with valves (57) and (54) are also provided for the cathodic cell (3''). The upper cathodic side outlet Valve (54) is for discharging overflow, and the lower cathodic side outlet valve (57) is used for exhausting the spent liquid in the cathodic cell (3'').

The reactor (5) has a first reactor outlet (46), which is connected to a magnetic valve (6) for discharging disinfected water. A monitor (1), a known proportional pulse monitor, is connected to the electric power source (2) and a sensing element (4) via wires (12) and (9), respectively. The sensing element (4) is provided in the upper part of the reactor (5) and detects the residual $ClO_2$ content which should be in the range of about 0.5–1.5 ppm in the disinfected water. $ClO_2$ in water generates an electric potential which is directly proportional to the concentration of $ClO_2$ in water. The electrical signal generated in proportion to the detected $ClO_2$ content is fed back to the monitor (1). If the signal is outside a range corresponding to the desired $ClO_2$ content range, it causes the monitor (1) to adjust the voltage and current applied to the anode (30), which in turn increases or decreases the level of $ClO_2$ produced in the electrolytic generator (3) to produce a desired residual level of $ClO_2$, e.g. about 0.5–1.5 ppm in the disinfected water. The magnetic valve (6) opens or closes in accordance with the signal transmitted by the monitor (1) so as to control the amount of disinfected water being discharged. At the right lower part of the reactor (5) a second reactor outlet (38) is connected to a valve (56) via a pipe to remove all fluid in the reactor.

Figure 2:
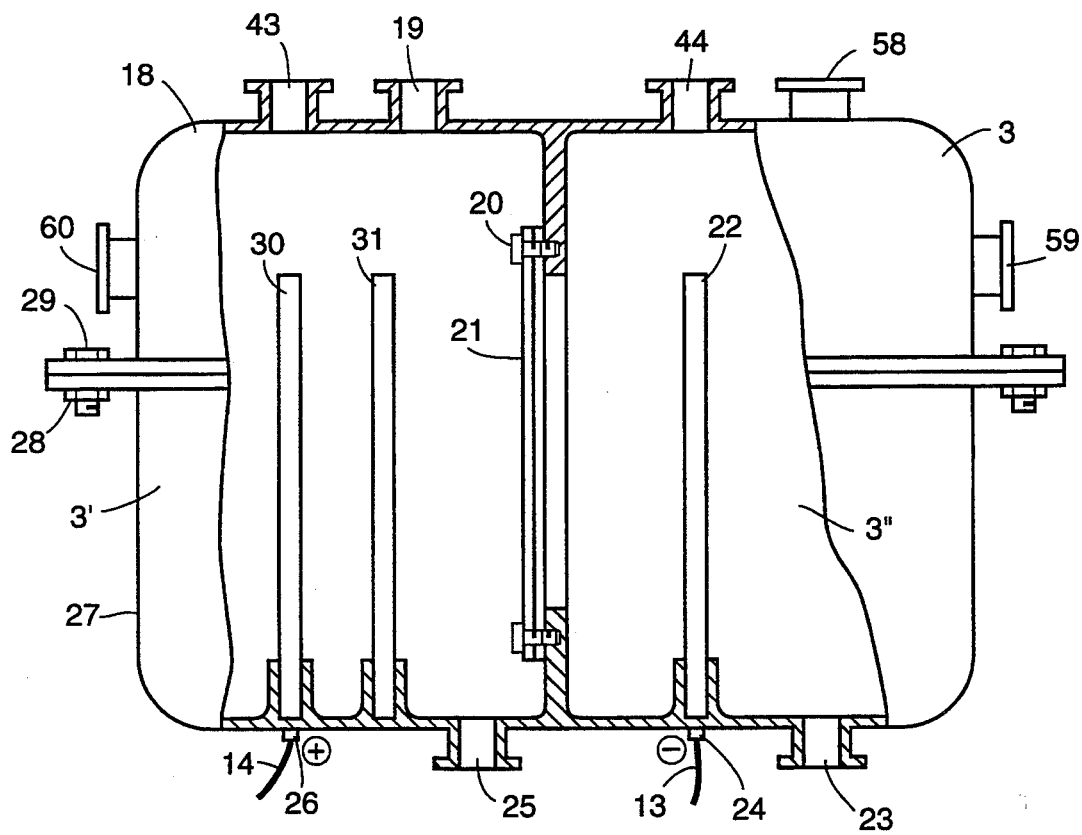
FIG. 2 is a structural diagram showing an embodiment of an electrolytic generator of $ClO_2$ according to the present invention.

FIG. 2 shows another embodiment of the $ClO_2$ electrolysis generator according to the invention. The generator comprises an upper generator chassis (18) and a lower generator chassis (27) joined together with bolts (29) and nuts (28). The bottom of the lower generator chassis (27) is provided with three slots, into which an anode (30), a neutral electrode (31) and a cathode (22) are individually inserted. The electrodes (30) and (22) are fixed to the lower generator chassis (27) by screws (26) and (24) to which electric wires (13) and (14) are connected. The anode is preferably made from a titanium based fire elements coated material. Two lower outlets (23) and (25) are provided on the lower chassis (27) and are normally closed. These lower outlets (23) and (25) are only opened for discharging used liquid and dregs to clean out the anodic and cathodic cells of the generator (3). On the top of the upper generator chassis (18), two inlets (43) and (58) are provided to feed an aqueous NaCl solution into the anodic cell and distilled water into the cathodic cell respectively. Two outlets (19) and (44) are also provided which serve to remove ClO$_2$ from the anodic cell and hydrogen from the cathodic cell. A rib is provided in the middle of each of the upper (18) and lower chassis (27) respectively. Two pieces of cation permeable membranes (21) are attached by screws (20) to the ribs and divide the electrolytic generator (3) into two cells: an anodic cell (3'), and a cathodic cell (3''). Na$^+$cations in the solution diffuse to the cathodic cell (3'') from the anodic cell (3') through said membranes. Since the potential of the neutral electrode (31) is lower than that of the anode (30), the cations are guided by the neutral electrode and drawn to the cathode (22) in the cathodic cell (3'').

Figure 3:
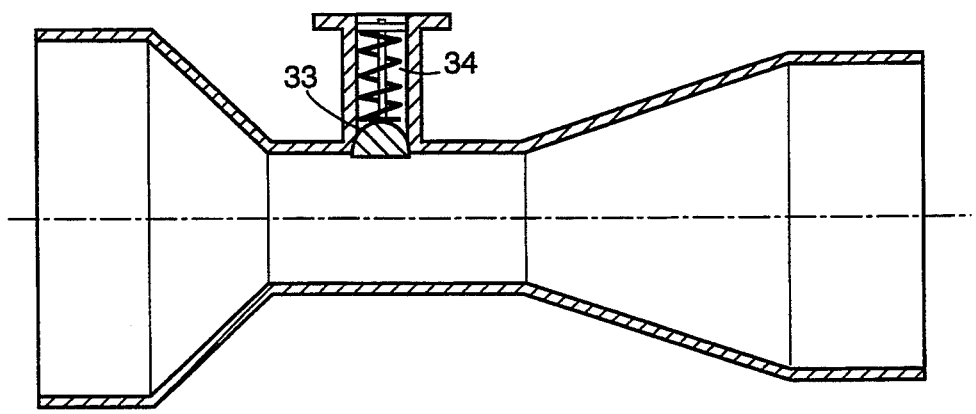
FIG. 3 is a sectional diagram of an embodiment of the wye according to the present invention.

FIG. 3 is a sectional diagram of an embodiment of the wye (7) according to the invention. The wye is constructed in the shape of a horizontal venturi mouthpiece. The internal diameter of left portion of the wye (7) gradually decreases from left to right, and that of right portion increases gradually from left to right. The diameter of the central portion of the wye (7) is smaller than that of both the left and right portions. A valve comprising a spring (34) and a hemispherical seat (33) is mounted in the upper part of the central portion of the wye (7). As shown in FIG. 1, sewage or industrial waste water enters the left part of the wye (7) via a pipe (15), and ClO$_2$ gas is transferred to the central portion of the wye (7) via a second pipe (11). Due to the drawing of fluid into the reactor by pumping, a negative pressure is created in the wye (7), the negative pressure causes the spring (34) in the valve to be stretched, and the hemispherical seat (33) is pulled downward. This introduces ClO$_2$ gas into the wye where it is mixed with the polluted water. The mixture enters the reactor (5) on the left.

Figure 4:
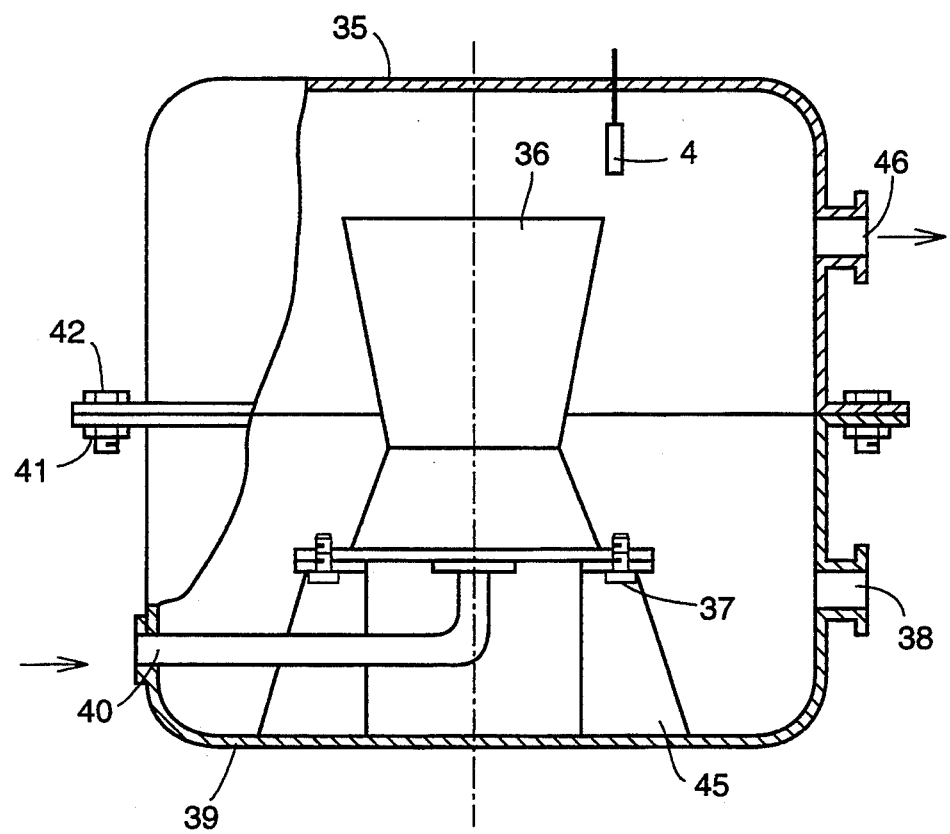
FIG. 4 shows the structure of an embodiment of the reactor for disinfecting according to the present invention.

FIG. 4 is a schematic diagram of an embodiment of the reactor (5) according to the invention. The reactor (5) is constructed in the form of a barrel with an upper reactor chassis (35) and a lower reactor chassis (39) joined with bolts (41) and nuts (42). At the left lower side of the lower reactor chassis (39), a bent pipe (40) is mounted. The left end of the pipe (40) is connected to the right portion of the wye (7), and the right end of the pipe is bent upward and connected to the bottom of a mixer (36). The shape of the mixer (36) is that of two truncated cones joined fixedly at their smaller ends in the shape of an hourglass. That is, for the upper portion of the mixer the upper diameter is larger than the lower diameter, and for lower portion of the mixer the lower diameter is larger than the upper diameter. The lower portion of the mixer (36) is fixed to a support (45) by screws (37). The polluted water to be treated and ClO$_2$ solution enter the mixer (36) through the bent pipe, where the water and the solution are mixed homogeneously and the chemical disinfection reaction takes place. A second reactor outlet (38) is connected to the bottom of the lower reactor chassis (39) for cleaning out the reactor. A first reactor outlet (46) is connected to the right side of the upper reactor chassis (35) for removing the disinfected water.

In this embodiment, the applied voltage of the electrolytic generator (3) is adjusted to be in the range of about 6-12 V, preferably about 9-10 V, the applied current density of the anode is adjusted to be in the range of 1-25 A/dm$^2$, preferably about 14-20 A/dm$^2$ the ratio of the area of the anode to the cathode is 1:1 to 1:20, and the ratio of the area of the anode plate to the volume of the solution or water is in the range of 0.1-0.8 dm$^2$/L.

The desired ratio of the area of the anode and the cathode is calculated by using the following equations:

$$F_{anode} = I/i_{anode} = W \bullet \lambda;$$

$$F_{cathode} = F_{anode}/M;$$

where
$F_{anode}$ = the area of anode plate (dm$^2$);
$F_{cathode}$ = the area of cathode plate (dm$^2$);
$i_{anode}$ = the current density of the anode (A/dm$^2$);
$\lambda$ = a ratio of the area of the anode plate to the volume of the water (dm$^2$/L);
I = total current applied (A);
W = total volume of solution or water; and
M = a ratio of the area of the anode plate to the area of the cathode plate.

Inside the electrolytic generator (3), the neutral electrode (31) is installed between the anode (30) and the cation permeable membranes (21). The neutral electrode promotes the rate of diffusion of the cations through the membranes under the action of the applied electric field. By increasing the area of the cathode plate, the current density of the anode is increased and leads to an increase in the amount of ClO$_2$ gas generated.

The electrochemical reactions of the disinfection process according to the present invention are as follows:

Reactions of the anode in the anodic cell:

2H$_2$O $\longrightarrow$ 4H$^+$ + O$_2$ + 4e  (water is electrolyzed at the anode)

2Cl$^-$ $\longrightarrow$ Cl$_2$ + 2e  (chloride ion is oxidized to Cl$_2$)

Cl$^-$ $\longrightarrow$ [Cl] + e  (at certain current densities, nascent chlorine is produced)

Secondary reactions close to the cathode:

Cl$_2$ + 2O$_2$ $\longrightarrow$ ClO$_2$  (generally it is considered that nascent oxygen [O] participates in this reaction)

Cl$_2$ + H$_2$O $\longrightarrow$ HCl + HOCl  (general chemical reaction)

HOCl $\longrightarrow$ HCl + [O]  (a catalytic reaction by means of the electrode material)

H$_2$O + [O] $\longrightarrow$ H$_2$O$_2$  (minimal process)

H$_2$O$_2$ $\longrightarrow$ H$_2$O + [O]

O$_2$ + [O] $\longrightarrow$ O$_3$  (under certain catalytic conditions small amount of oxygen is formed and released at a certain current densities)

NaCl + O$_2$ $\longrightarrow$ NaClO$_2$  (in the presence of nascent oxygen)

5NaClO$_2$ + 4HCl $\longrightarrow$ 4ClO$_2$ + 5NaCl + 2H$_2$O  (general chemical reaction)

Cl$_2$ + 2NaClO$_2$ $\longrightarrow$ 2NaCl + 2ClO$_2$

Reactions at the cathode in the cathodic cell:

$$2Na^+ + 2e \longrightarrow 2Na$$ (Na$^+$ - ions enter the cathode electrolysis cell through cation permeable membranes from the anodic cell, and are reduced by the cathode)

$$2H_2O + 2e^- \longrightarrow 2OH^- + H_2\uparrow$$ (releasing of hydrogen)

$$2H^+ + 2e^- \longrightarrow H_2\uparrow$$

$$Na^+ + OH^- \longrightarrow NaOH$$

$$2Na + 2H_2O \longrightarrow 2NaOH + H_2\uparrow$$ (hydrolysis)

Under the conditions described hereinabove, during electrolysis, $ClO_2$ as well as a small amount of $Cl_2$, $O_3$, $H_2O_2$ gases are produced in the anodic cell. These gases are drawn into the wye (7) together with $ClO_2$ and dissolved in the polluted water which is to be treated. The concentration of $ClO_2$ gas drawn may be adjusted by the regulating valve (47).

Sewage or industrial waste water in which $ClO_2$ gas is dissolved enters the mixer (36) mounted in the reactor (5). The solubility of $ClO_2$ gas in water is 2.0 g/L, about 5 times the solubility of chlorine gas in water. The function of the mixer (36) is similar to that of a venturi, i.e. to form a rapidly circulating area in the mixer (36) in the central portion of the reactor (5) caused by the negative pressure created in the mixer. The rapid circulating motion causes rapid stirring and shortens the reaction time, thus improving the effectiveness of the disinfection process.

A sensing element (4) introduced into the upper portion of the reactor (5) detects the amount of $ClO_2$ content in the reactor (5). An electrical signal corresponding to the amount of $ClO_2$ detected a fed back to a monitor (1) to regulate the voltage and current output from the electric power source (2) which is controlled by a silicon controlled rectifier controlled by a pulse controller (not shown), so that by regulating the voltage and the current density applied to the anode, the amount of $ClO_2$ gas generated in the electrolytic generator (3) can be regulated as desired.

As compared with the prior art, the apparatus for disinfecting water according to the present invention is simpler in structure, and provides an improved degree of disinfection. The advantages are as follows:

a) In the apparatus and process for disinfecting water according to the present invention, sewage or industrial waste water is disinfected by $ClO_2$ instead of NaOCl or $Cl_2$. $Cl_2$ in $ClO_2$ is 52.6% by weight. The valence state of the chloride ion in $ClO_2$ changes from +4 to -1 during the reaction. That is to say, the equivalent weight is 1/5 the atomic weight of Cl. Accordingly, chlorine in $ClO_2$ is effectively 5×52.6%, or 263% of that of the chlorine content. Therefore, the disinfecting potential of $ClO_2$ is much higher than that of NaOCl. Moreover, the effect of $ClO_2$ for disinfecting and killing bacteria is excellent because of the combined action of $ClO_2$ with small amounts of $O_3$, $Cl_2$, and $H_2O_2$ also generated in the process.

b) Compared to NaOCl generators of the prior art, the apparatus according to the present invention significantly reduces the consumption of electrical power and the amount of NaCl. For example, to produce 1 kg of $ClO_2$, 3.5–5 KWh of power and 1.2–3 kg of salt are consumed. Whereas, for reproducing 1 kg of NaOCl 4.5–6 KWh of power and 4–6 kg of salt are consumed.

c) Since $ClO_2$ disinfects by oxidation, rather than chlorination, the production of chloro-hydrocarbons, known to be teratogenic and/or carcinogenic, is avoided.

d) The disinfective potential of $ClO_2$ is not affected by the pH of solution. Its bactericidal effect in the presence of ammonia containing substances is also not affected, because $ClO_2$ is not hydrolyzed by water. When $Cl_2$ and/or NaOCl solution is employed for disinfecting polluted water having a high content of organic substances, such as proteins, the quantity of $Cl_2$ and/or NaOCl used for disinfecting must be increased by up to 20–30 times of that used normally to achieve the same level of purity and disinfection.

e) Using the known standard relationship between the concentration of $ClO_2$ and the amount of bacteria in water as a reference, an electric signal representing the amount of $ClO_2$ content detected by a sensing element mounted in the upper portion of the reactor is fed to a monitor which automatically adjust the voltage and current being applied to the anode of the electrolytic generator so as to continuously obtain a satisfactory degree of disinfection. This automatic regulation also lowers electric power consumption. At the same time, there is less need for the repetitive and tedious work necessary to monitor the amount of bacteria in the disinfected water.

While the present invention has been described with reference to specific embodiments, various modifications and substitutions known to those skilled in the art may be incorporated without departing from the spirit and scope of the invention as claimed.

What is claimed is:

1. An apparatus for disinfecting polluted water comprising:

an electrolytic generator comprising an anodic cell provided with an anode and a neutral electrode and a cathodic cell provided with a cathode, the anodic cell and the cathodic cell being separated by a plurality of cation permeable membranes;

a reactor comprising a mixer in the shave of two truncated cones joined fixedly at the smaller end for thoroughly mixing polluted water with oxidant gas produced by said generator a wye comprising two portions, a right portion connected to said reactor via a pipe and a left portion connected to a supply of polluted water via a pipe connected to a pump:

a regulating valve connected in parallel with the left and right portions of said wye;

a monitor for regulating the voltage and current applied to said electrodes;

a sensing element for continuously detecting the amount of $ClO_2$ in the reactor as an electrical signal and sending the electrical signal representing the amount of $ClO_2$ detected to said monitor; and an electric power source connected to said monitor which in turn is connected to said sensing element mounted in the upper portion of the reactor, and connected to said anode, neutral electrode and cathode for applying an electric potential in volts and current in amperes to the electrodes.

2. An apparatus according to claim 1, wherein, said wye is in the shape of a horizontal venturi with a left portion, a right portion and a central portion, wherein the internal diameter of the left portion connected to said electrolytic generator decreases gradually from left to right, the internal diameter of the right portion connected to said reactor increases gradually from left to right, and the internal diameter of the central portion is smaller than that of both the left and right portions and mounted thereon the central portion is a valve comprising a spring and a hemispherical seat actionable by a pressure differential applied to the valve.

3. An apparatus according to claim 2, wherein, said electrolytic generator comprises an upper generator chassis and a lower generator chassis joined together with bolts and nuts with the middle part of both the upper generator chassis and the lower generator chassis provided with ribs to which are fitted a plurality of cation permeable membranes separating the anodic cell on the left and the cathodic cell on the right; wherein the bottom of the lower generator chassis are provided with three slots for inserting an anode, a neutral electrode and a cathode respectively; the anode being connected to a positive terminal and the cathode being connected to a negative terminal of the electric power source; and wherein the anodic cell portion of the upper chassis is provided with an inlet for feeding an aqueous NaCl solution, an outlet for removing $ClO_2$ gas and an anodic cell discharge outlet; and wherein the cathodic cell portion is provided with the inlet for feeding distilled water, and outlet for removing hydrogen gas, and a cathodic cell discharge outlet; and said mixer of the reactor comprises a upper mixer chassis and a lower mixer chassis in the shape of truncated cones joined by bolts and nuts, having a bent tube connecting the left side of the reactor to the bottom of said mixer; and having an outlet mounted on the right side of said reactor for removing the disinfected water.

4. An apparatus according to claim 1, wherein, said electrolytic generator comprises an upper generator chassis and a lower generator chassis joined together with bolts and nuts with the middle part of both the upper generator chassis and the lower generator chassis provided with ribs to which are fitted a plurality of cation permeable membranes separating the anodic cell on the left and the cathodic cell on the right; wherein the bottom of the lower generator chassis are provided with three slots for inserting an anode, a neutral electrode and a cathode respectively; the anode being connected to a positive terminal and the cathode being connected to a negative terminal of the electric power source; and wherein the anodic cell portion of the upper chassis is provided with an inlet for feeding an aqueous NaCl solution, an outlet for removing $ClO_2$ gas and an anodic cell discharge outlet; and wherein the cathodic cell portion is provided with an inlet for feeding distilled water, an outlet for removing hydrogen gas, and a cathodic cell discharge outlet; and said mixer of the reactor comprises a upper mixer chassis and a lower mixer chassis in the shape of truncated cones joined by bolts and nuts, having a bent tube connecting the left side of the reactor to the bottom of said mixer; and having an outlet mounted on the right side of said reactor for removing the disinfected water.

* * * * *